United States Patent [19]

Battle et al.

[11] 4,214,421
[45] Jul. 29, 1980

[54] HORSE BLANKET AND HOOD APPARATUS

[76] Inventors: Dick R. Battle, 2422 NW. 59th, Oklahoma City, Okla. 73112; Dick M. Battle, 8000 Lakehurst Rd., Oklahoma City, Okla. 93120

[21] Appl. No.: 830,432

[22] Filed: Sep. 6, 1977

[51] Int. Cl.³ .............................................. B68C 5/00
[52] U.S. Cl. ...................................................... 54/79
[58] Field of Search ................... 54/4, 23, 33, 34, 58, 54/68, 79; 128/133, 134, DIG. 15; 24/69 ST, 73 A, 68 R, 72, 201 HE, 265 AL; 2/338; 119/96; 150/43

[56] References Cited

U.S. PATENT DOCUMENTS

| 215,983 | 5/1879 | Simpson | 54/79 |
| 463,381 | 11/1891 | Fales | 54/79 |
| 512,385 | 1/1894 | Mishler | 54/79 |
| 2,664,083 | 12/1953 | Heymans | 128/134 |
| 3,241,881 | 3/1966 | Carnahan | 2/338 X |
| 3,543,977 | 12/1970 | Lockridge | 128/DIG. 15 X |

Primary Examiner—Russell R. Kinsey
Assistant Examiner—Robert P. Swiatek
Attorney, Agent, or Firm—Dunlap, Codding & McCarthy

[57] ABSTRACT

A horse blanket and hood having improved strap and strap closure assemblies for connecting the blanket and the hood to a horse.

4 Claims, 7 Drawing Figures

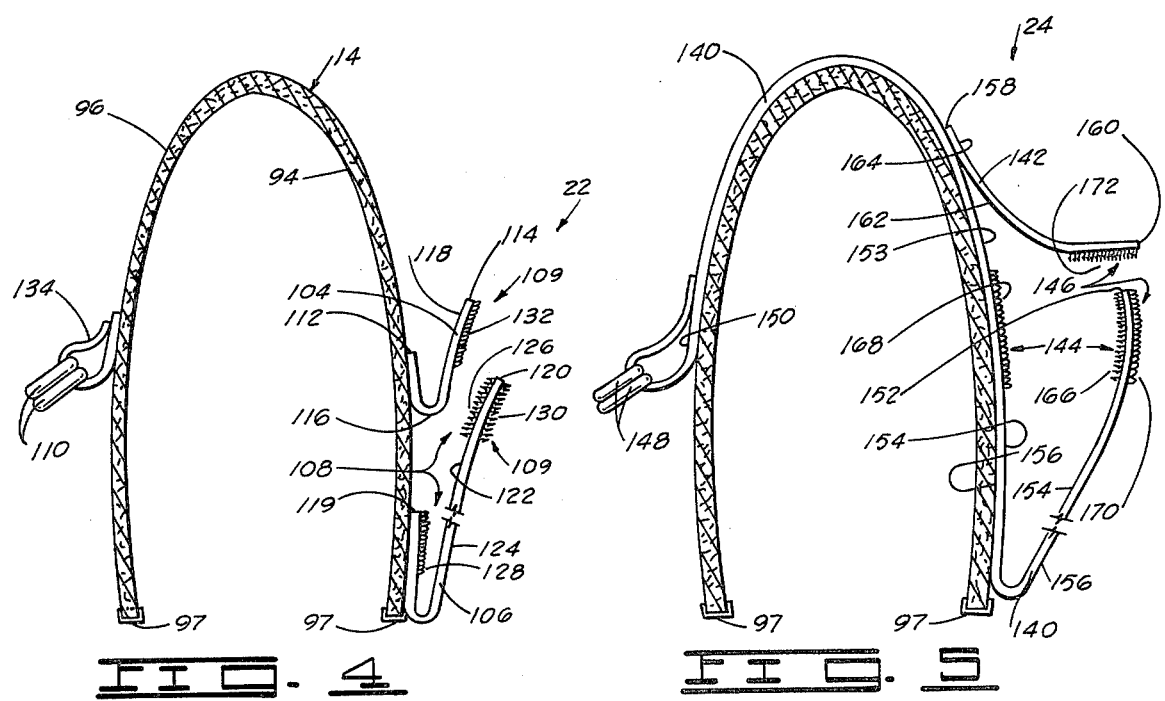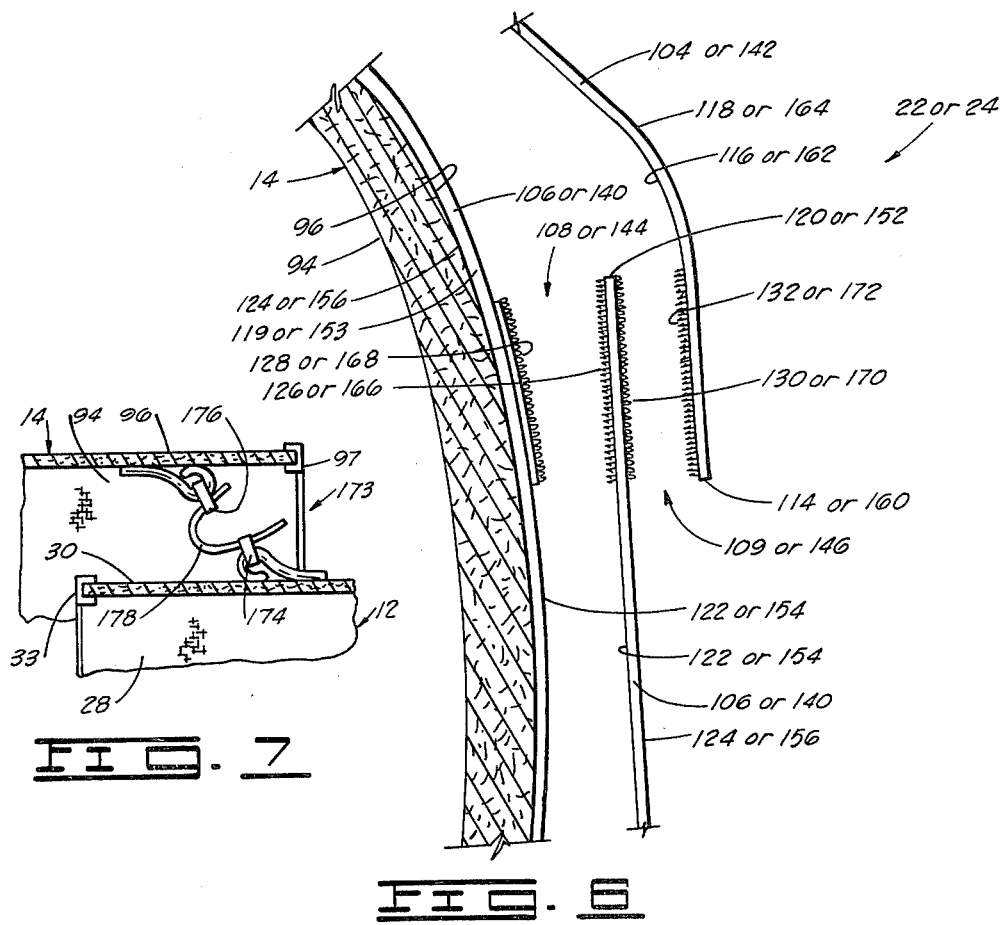

HORSE BLANKET AND HOOD APPARATUS

BACKGROUND OF THE INVENTION

1. Field of the Invention

The present invention relates generally to horse blankets and hoods and, more particularly, but not by way of limitation, to blankets and hoods used on show horses, and means for maintaining blankets and hoods in a fixed position on a horse.

2. Prior Art

The general construction of horse blankets has remained virtually unchanged for many years. Relatively little recent prior art is available concerning horse blanket construction, and, in fact, most related prior art is dated before nineteen-hundred (1900). More particularly, the field of closure and fastener apparatus utilized to attach a blanket to a horse has evidently failed to advance to a state made possible via various synthetic materials developed in the past few years. In other words, horse blankets and associated hardware are substantially the same today as they were fifty or one hundred years ago.

One aspect of horse blanket construction concerns the type of blanket material used. One well known material used in horse blanket construction is blanketing jute, as is disclosed in the U.S. Pat. No. 518,833, issued to E. H. Cooper. Some other aspects of blanket construction include: the shaping of the neck and rear openings of a blanket; ventilative or insulative qualities of a blanket; and means by which a blanket is attached to a horse.

The U.S. Pat. No. 177,809, issued to A. E. Crittenden, shows a horse blanket having a neck portion which appears to at least partially cover the mane of a horse wearing the blanket. On the other hand, the U.S. Pat. No. 502,508, issued to H. B. Cleveland and W. E. Tuller, shows a horse blanket having a neck portion which is apparently removed from the mane portion of a horse's neck. The patent issued to Cleveland and Tuller also shows a horse blanket which substantially wraps around a horse's hips, while the U.S. Pat. No. 512,385, issued to P. M. Mishler, shows a blanket which apparently leaves a horse's buttocks exposed.

Horse blankets such as the one shown in the Crittenden patent are purposefully loose fitting to increase the comfort of a horse wearing such a blanket. However, a blanket such as the one shown in the U.S. Pat. No. 1,196,203, issued to P. J. Borbridge, appears to more fully, and tightly, enclose a horse, evidently to keep the animal warm. It is especially desirable to keep animals such as a show horse warm at all times during cold weather. If a show horse is allowed to be exposed to cold weather, the horse will "hair up", or grow a winter coat, which is undesirable in the grooming of show horses.

A variety of fastening apparatus have been utilized to maintain a horse blanket in a fixed position on a horse. One type of fastener apparatus used to close an open front end horse blanket is disclosed in the U.S. Pat. No. 481,326, issued to C. A. Harvey. The U.S. Pat. No. 518,833, issued to E. H. Cooper, also shows a fastener apparatus utilized on an open front end horse blanket. A rear leg strap closure assembly is disclosed in the Borbridge patent; and other strap-like fasteners are disclosed in the U.S. Pat. Nos. 1,051,618, issued to J. G. Murphy, and 3,626,663, issued to J. R. Moon.

In general, several undesirable characteristics are inherent in horse blankets constructed in accordance with the above patents. First, it is desirable, particularly with show horses, for a horse to be completely covered during cold weather to prevent hairing up, while at the same time remaining comfortable and unbothered by the blanket. Since horses in general have a tendency to kick and bite at bothersome binding straps, or the like, it is also desirable to have a blanket wherein the binding straps do not rub or chafe the animal, and wherein all loose strap ends are made fast by some type of closure means. Of course, it is also desirable to have a horse blanket which can easily and quickly be attached to, or removed from, a horse, is relatively light weight and durable, and is easily cleaned and maintained.

SUMMARY OF THE INVENTION

A horse blanket and hood having improved strap and strap closure assemblies for connecting the blanket and the hood to a horse. The blanket, hood and straps are fabricated from improved materials which provide characteristics desired by owners of show horses and the like. The strap closure assemblies are of two general types: those utilizing conventional strap hardware, and those utilizing Velcro-like closure assemblies to provide an improved slip-proof, load absorbing connection between straps.

One object of the present invention is to provide a horse blanket and hood constructed of improved materials, and having improved strap and strap closure assemblies for attaching the blanket and the hood to a horse.

Another object of the present invention is to provide an improved horse blanket and hood which will prevent a horse from hairing up in cold weather and growing a winter coat.

Still another object of the present invention is to provide improved leg straps and strap closure assemblies which fit comfortably around the rear legs of a horse.

One other object of the present invention is to provide improved closure assemblies for connecting a hood to a horse.

Still another object of the present invention is to provide a horse blanket and a hood having improved closure assemblies which are uneffected by the kicking or biting of a horse wearing the blanket and hood.

One other object of the present invention is to provide an improved horse blanket and hood which can easily and quickly be attached to, or removed from, a horse, are relatively light weight and durable, and are easily cleaned and maintained.

Another object of the present invention is to provide strap closure assemblies which provide slip-proof connections between straps.

Other objects, advantages and features of the present invention will become apparent from the following description of the preferred embodiment when read in conjunction with the drawings and appended claims.

BRIEF DESCRIPTION OF THE DRAWINGS

FIG. 4 is a close-up, sectional view of a portion of the hood of FIG. 1 showing a first hood strap closure assembly.

FIG. 5 is a close-up, sectional view of a portion of the hood of FIG. 1 showing a second hood strap closure assembly.

FIG. 6 is a close-up, sectional view of a portion of one of the hood strap closure assemblies shown in FIG. 1.

FIG. 7 is a close-up, sectional view of a portion of the hood and blanket of FIG. 1 showing one of the strap assemblies.

DESCRIPTION OF THE PREFERRED EMBODIMENT

Figure 1:
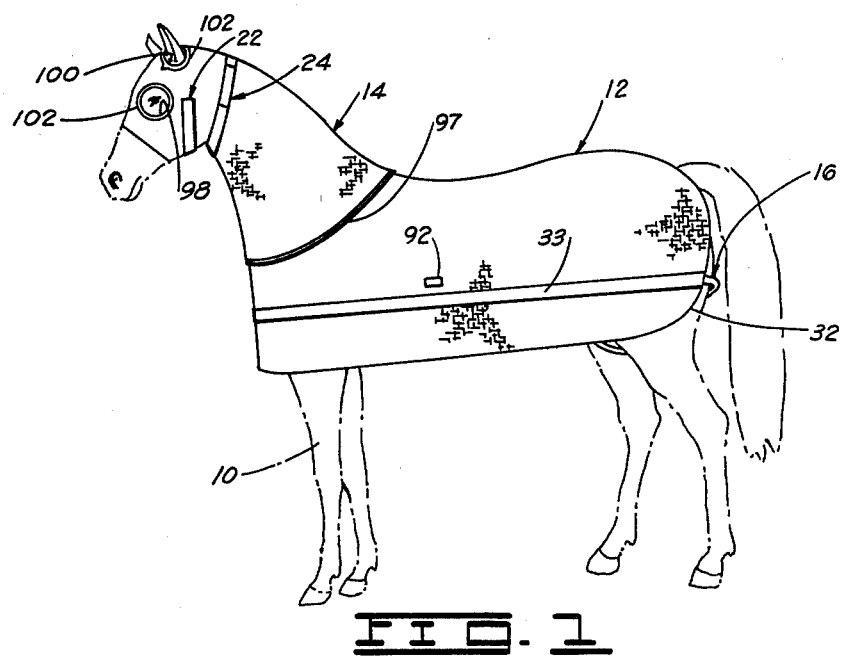
FIG. 1 is a perspective view of a horse wearing a blanket and hood constructed in accordance with the present invention.

Referring to the Figures in general, and to FIG. 1 in particular, shown therein and designated by the general reference numeral 10 is a horse wearing a blanket 12 and a hood 14 constructed in accordance with the present invention. The blanket 12 is attached to the horse 10 via a pair of rear leg strap closure assemblies 16, and a girth strap assembly 20 (shown in FIG. 3). The hood 14 is attached over the head and neck portions of the horse 10 generally via a first hood strap closure assembly 22 and a second hood strap closure assembly 24.

DESCRIPTION OF THE BLANKET

The blanket 12 has an inner or first surface 28 and an outer or second surface 30. In an attached position of the blanket 12 on the horse 10, the blanket 12 substantially covers the body portion of the horse 10, with right side and left side rear end portions of the blanket 12 substantially covering the horse's buttocks. In addition, an upper front end portion of the blanket 12 is formed such that the blanket 12 generally exposes the horse's mane. Thus, rubbing and chafing of the mane by the blanket 12 are prevented.

The outer peripheral edge of the blanket 12 has an edging or binding 32 connected to adjacent edge portions of the inner and outer surfaces 28 and 30 of the blanket 12. The edging 32 is utilized to bind adjacent edge portions of the materials forming the blanket 12, and to prevent ravelling of the materials.

A binding strap 33 is connected longitudinally along the outer surface 30 of each side portion of the blanket 12. One end portion of the binding strap 33 is connected to a right side rear end portion of the blanket 12, and another end portion of the binding strap 33 is similarly connected to a left side rear end portion of the blanket 12. In other words, the binding strap 33 extends substantially around the blanket 12, if the blanket 12 is of the closed front end type. Of course, if the blanket 12 is of the open front end type, a shorter binding strap 33 will be required on each side of the blanket 12.

As indicated above, the front end portion of the blanket 12 may be of the closed end type, or the open end type. If the front end portion of the blanket 12 is of the open end type, it is preferable that overlapping right and left side portions of the front end portion be provided with cooperating closure apparatus such as "common sense twist-type fasteners" (not shown).

In the preferred embodiment, the blanket 12 is generally constructed of lightweight and durable materials which will provide suitable insulation for the horse 10 while also being comfortable to the horse 10. More particularly, the blanket 12 is preferably constructed of an inner layer of rip-stop nylon liner, and an outer layer of nylon shell identified by the tradename Antron, with a medial layer of polyester fiberfill positioned between the inner and outer layers of material. In other words, the inner layer substantially defines the inner surface 28, and the outer layer substantially defines the outer surface 30. In addition, the materials forming the inner and outer layers and the medial layer are preferably sewn together in a quilted manner via wrapped nylon thread.

The binding strap 33 is preferably constructed of a material such as two inch nylon webbing sewn to the materials forming the blanket 12 via wrapped nylon thread. The edging 32 is preferably in the form of one hundred percent (100%) nylon material, and sewn to the inner and outer material layers via wrapped nylon thread.

DESCRIPTION OF THE REAR LEG STRAP CLOSURE ASSEMBLIES

Figure 2:
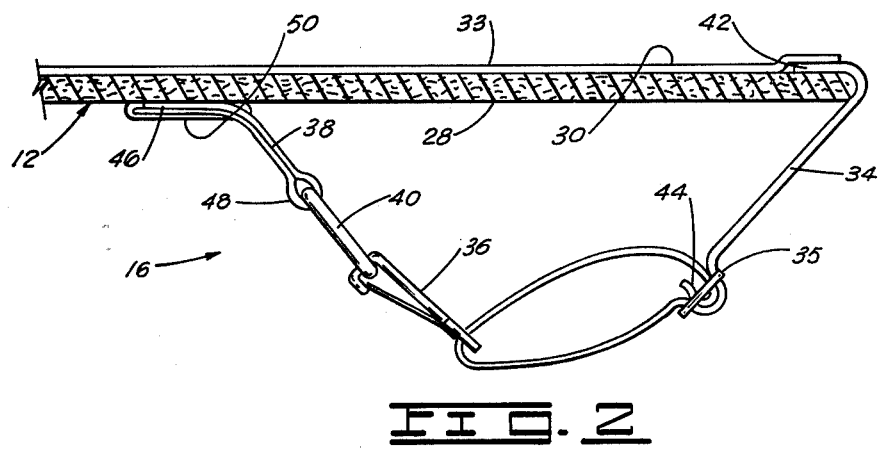
FIG. 2 is a close-up, sectional view of a portion of the blanket of FIG. 1 showing a rear leg strap closure assembly.

Referring to FIG. 2, each rear leg strap closure assembly 16 generally comprises a first strap 34, a buckle 35, a snap shackle 36, a second strap 38, and a D-ring 40. Each first strap 34 has a fixed end portion 42 connected to a rear end side portion of the outer surface 30 of the blanket 12 generally near a portion of the edging 32, and a free end portion 44. More particularly, the fixed end portion 42 of each first strap 34 is connected to one of the end portions of the binding strap 33. The free end portion 44 of each first strap 34 is adjustably connected to one of the buckles 35 in a looped manner. Thus, the effective length of each first strap 34 is selectively adjustable.

The second straps 38 are relatively short, in relation to the first straps 34, and are constructed of an elastic material. The elastic material forming each second strap 38 is preferably of double thickness to enhance the resilient strength of the respective rear leg strap closure assembly 16. Each second strap 38 has a fixed end portion 46 connected to a portion of the inner surface 28 of the blanket 12 opposite the first end 42 of one of the first straps 34. Each second strap 38 also has a free end portion 48. Each free end portion 48 is substantially in the form of a loop formed via the double thickness of the material forming the respective second strap 38.

Each snap shackle 36 is slidably connected to the looped free end portion 44 of one of the first straps 34. In a similar manner, each D-ring 40 is slidably connected to the looped free end portion 48 of one of the second straps 38. Each snap shackle 36 is removably connected to one of the D-rings 40, with the associated first strap 34 extending around the respective left or right leg of the horse 10, in a connected position to one of the snap shackles 36 and respective D-ring 40.

In the preferred embodiment, the first straps 34 are constructed of a material such as one inch nylon webbing, and the second straps 38 are constructed of a material such as conventional elastic webbing. A reinforcing patch 50 is lapped over and connected to the fixed end portion 46 of each second strap 38 and an adjacent portion of the inner surface 28 of the blanket 12, opposite a portion of the binding strap 33. More particularly, each reinforcing patch 50, the respective second strap 38, the adjacent portion of the blanket 12, and the binding strap 33 are interconnected via wrapped nylon thread. The reinforcing patches 50 facilitate in transferring any force applied to one of the rear leg strap closure assemblies 16 to the binding strap 33, and thereby to the front end portion of the blanket 12 and the other of the rear leg strap closure assemblies 16.

Thus, if the horse 10 kicks its left leg, for example, the kicking force is partially absorbed via the resiliency of the respective second strap 38, with the kicking force being distributed to the chest portion and the right leg of the horse 10. In other words, the horse 10 substantially works against itself, and will soon learn not to kick.

The sewing patches 50 are preferably constructed of a material such as plastic coated nylon fibers, otherwise known by the tradename Herculite. The snap shackles 36 and the D-rings 40 are of conventional construction.

DESCRIPTION OF THE GIRTH STRAP ASSEMBLY

Figure 3:
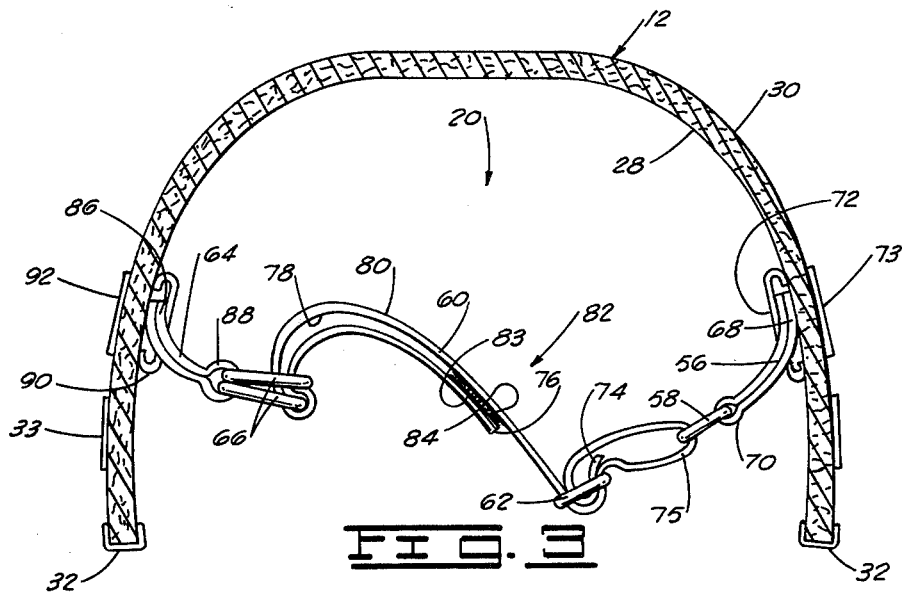
FIG. 3 is a close-up, sectional view of a portion of the blanket of FIG. 1 showing a girth strap assembly.

The girth strap assembly 20, shown more clearly in FIG. 3, generally comprises a first strap 56, a ring 58, a second strap 60, a slide ring 62, a third strap 64, and a pair of D-rings 66. The first strap 56 has a fixed end portion 68 connected to a side portion of the inner surface 28 of the blanket 12, and a free end portion 70. The material forming the first strap 56 is preferably doubled over wherein the free end portion 70 is looped through the ring 58. A reinforcing patch 72 is lapped over and connected to the first end portion 68 of the first strap 56 and an adjacent portion of the inner surface 28 of the blanket 12. A similar reinforcing patch 73 is connected to a portion of the outer surface 30 of the blanket 12, opposite the patch 72. More particularly, the patches 72 and 73 are sewn to the first end portion 68 of the first strap 56 and the blanket 12 via wrapped nylon thread.

The second strap 60 has a looped first end portion 74 and a free end portion 76. The looped first end portion 74 is connected to the ring 58 via the slide ring 62. Thus, the effective length of the second strap 60 is manually adjustable by way of the slide ring 62.

The second strap 60 also has a first surface 78 and an opposite second surface 80. A closure assembly 82 has a first portion 83 connected to a medial portion of the first surface 78, generally between the adjusting ring 62 and the second end portion 76 of the second strap 60. A second portion 84 of the closure apparatus 82 is connected to a portion of the first surface 78 of the second strap 60 near the second end portion 76 thereof. One of the first and second portions 83 and 84, respectively, of the closure apparatus 82 defines a male portion of the closure apparatus 82, and the other of the first and second portions 83 and 84, respectively, defines a female portion of the closure apparatus 82, the male portion being generally insertable into and engagable with the female portion.

In the preferred embodiment, the closure apparatus 82 is in the form of a material known by the trademark Velcro. In general, Velcro includes a male portion comprising a plurality of resilient hook elements, and a female portion comprising a plurality of resilient loop elements. When the male and female portions of the Velcro material are pressed together, the resilient hook elements removably engage the resilient loop elements. The male and female portions of the Velcro material are merely pulled apart in a preferred direction to disengage the hook elements from the loop elements.

The third strap 64 is similar in construction to the second straps 38 of the rear leg strap closure assemblies 16. That is, the material utilized in the construction of the third strap 64 is preferably constructed of elastic material doubled over as in the second straps 38. More particularly, the third strap 64 has a fixed end portion 86 generally connected to a side portion of the inner surface 28 of the blanket 12, and a free end portion 88. The free end portion 88 of the third strap 64 is connected alternately through the pair of D-rings 66, with the D-rings 66 being positioned in a side-by-side relationship.

A reinforcing patch 90, similar to the patch 72, is lapped over and connected to the first end portion 86 of the third strap 64 and an adjacent portion of the inner surface 28 of the blanket 12. Another reinforcing patch 92, similar to the patch 90, is connected to a portion of the outer surface 30 of the blanket 12, opposite the patch 90. The patches 90 and 92, the fixed end portion 86 of the third strap 64, and the adjacent portion of the blanket 12 are also sewn together via wrapped nylon thread.

When the blanket 12 is attached to the horse 10, the free end portion 76 of the second strap 60 is threaded through the D-rings 66. The free end portion 76 is then drawn back through one of the D-rings 66, in a conventional manner, and pulled until suitably tight around the belly portion of the horse 10. The first portion 83 of the closure apparatus 82 is then pressed into engagement with the second portion 84 thereof, with the girth strap assembly 20 thereby being in a connected position.

DESCRIPTION OF THE HOOD

As can be seen most clearly in FIGS. 4 and 5, the hood 14 has an inner surface 94 and an outer surface 96, with an edging 97 connected about the outer peripheral edge of the hood 14. The hood 14 is constructed of materials similar to the materials utilized in the construction of the blanket 12.

Referring back to FIG. 1, the hood 14 has a pair of eye openings 98 and a pair of ear openings 100 formed through respective side portions thereof. Each eye and ear opening 98 and 100 also has an edging 102 connected thereabout in a manner generally similar to that of the edging 32, for example. However, each edging 102 is preferably constructed of a material such as felt having a blend of wool and rayon in a ratio of approximately 70:30, respectively. It has been found that a material such as the felt material described above is more easily and smoothly contoured to the respective openings 98 and 100, and provides a more desirable appearance, than a material such as the nylon material utilized in the construction of the edging 32.

DESCRIPTION OF THE FIRST HOOD STRAP CLOSURE ASSEMBLY

As can be seen in FIG. 4, first hood strap closure assembly 22 generally comprises a first strap 104, a second strap 106, a first closure assembly 108, a similar second closure assembly 109, and a pair of D-rings 110. The first strap 104 has a fixed end portion 112 connected to a side portion of the outer surface 96 of the hood 14, and a free end portion 114. The first strap 104 also has a first surface 116 and an opposite second surface 118. The fixed end portion 112 of the first strap 104 is preferably sewn to the hood 14 via wrapped nylon thread.

The second strap 106 has a fixed end portion 119 connected to the outer surface 96 of the hood 14 adjacent to the first strap 104. The second strap 106 also has a free end portion 120, a first surface 122, and an opposite second surface 124.

Referring also to FIG. 6, the first closure assembly 108 has a first portion 126 connected to the first surface 122 of the second strap 106 near the free end portion 120 thereof, and a second portion 128 connected to the first surface 122 of the second strap 106 near the fixed end portion 119 thereof.

The second closure assembly 109 has a first portion 130 connected to the second surface 124 of the second strap 106 near the free end portion 120 thereof, opposite the first portion 126 of the first closure assembly 108. The second closure assembly 109 also has a second portion 132 connected to the first surface 116 of the first strap 104 near the free end portion 114 thereof.

Each respective portion of the first and the second closure assemblies 108 and 109 defines a male portion or a female portion thereof, in a manner similar to that of the closure assembly 82, with each male portion being insertable into and engageable with an associated female portion. Furthermore, the first and second closure assemblies 108 and 109 are preferably in the form of Velcro closure assemblies, as is the closure assembly 82. Therefore, the male portions of the first and second closure assemblies 108 and 109 are each comprised of a plurality of resilient hook elements, and the female portions thereof are each comprised of a plurality of resilient loop elements, with the hook elements again being removably engageable with associated loop elements.

For the purpose of describing the first hood strap closure assembly 22, it is convenient to consider the free end portion 120 of the second strap 106 as defining a free end portion of a first portion of flexible webbing, with the fixed end portion 119 of the second strap 106 defining a second portion of flexible webbing. Furthermore, the first and second surfaces 122 and 124, respectively, of the free end portion 120 similarly define opposite surfaces of the first portion of flexible webbing, and the portion of the first surface 122 near the fixed end portion 119 likewise defines a first surface of the second portion of flexible webbing. Since the free end portion 120 and the fixed end portion 119 (i.e., the first and second portions of flexible webbing, respectively) form integral portions of the strap 106, the first and second portions of flexible webbing can be considered as being integrally connected. In addition, it is also convenient to consider the free end portion 114 of the first strap 104 as defining a third portion of flexible webbing, with an adjacent portion of the first surface 116 of the first strap 104 defining a first surface of the third portion of flexible webbing.

Again, for purposes of explanation, it is convenient to consider the first portion 126 of the first closure assembly 108 as being connected to one of the surfaces of the free end portion of the first portion of flexible webbing (i.e., the first surface 122 of the free end portion 120), and the second portion 128 of the first closure assembly 108 as being connected to one of the first surfaces of the second or third portions of flexible webbing (i.e., the first surface 122 of the fixed end portion 119). It therefore follows that the first portion 130 of the second closure assembly 109 is connected to the other of the surfaces of the free end portion of the first portion of flexible webbing (i.e., the second surface 124 of the free end portion 120), and the second portion 132 of the second closure assembly 109 is connected to the other of the first surfaces of the second or third portions of flexible webbing (i.e., the first surface 116 of the first strap 104).

The D-rings 110 are connected to another side portion of the hood 14, generally opposite the first and second straps 104 and 106. More particularly, the D-rings 110 are connected to the hood 14 via a strap 134. That is, one end portion of the strap 134 is specifically connected to the outer surface 96 of the hood 14, with an opposite end portion of the strap 134 being looped through the D-rings 110, in a conventional manner.

After placing the hood 14 over the head portion of the horse 10, the free end portion 120 of the second strap 106 is threaded through both of the D-rings 110, and then back through one of the D-rings 110, in a conventional manner, and pulled in a direction back toward the fixed end portion 119 of the second strap 106, thereby causing the hood 14 to be tightened around the head portion of the horse 10.

When the hood 14 is sufficiently tightened, the first portion 126 of the first closure assembly 108 is pressed into engagement with the second portion 128 thereof causing some of the hook elements to removably engage the respective loop elements. Then, the second portion 132 of the second closure assembly 109 is pressed against the first portion 130 thereof whereby the respective hook elements and loop elements of the second closure assembly 109 are removably engaged. Thus, in a manner of speaking, said one surface of the free end portion of the first portion of flexible webbing (i.e., the first surface 122 of the free end portion 120) is removably connected to said first surface (i.e., the first surface 122 of the fixed end portion 119). Furthermore, said other surface of the free end portion of the first portion of flexible webbing (i.e., the second surface 124 of the free end portion 120) is removably connected to said other first surface (i.e., the first surface 116 of the first strap 104). In this connected position, the third portion of flexible webbing is substantially connected to the second portion of flexible webbing via the outer surface 96 of the hood 14, with the first surface of the third portion of flexible webbing (i.e., the first surface 116 of the first strap 104) being disposed adjacent to the first surface of the second portion of flexible webbing (i.e., the first surface 122 of the fixed end portion 119).

The free end portions 114 and 120 of the first and second straps 104 and 106 are thereby maintained in a fastened manner such that the horse 10 is unable to bite at the respective free end portions 114 and 120 thereof. Furthermore, the first hood strap closure assembly 22 is maintained in a virtually slip-proof condition, with any force applied to the first hood strap closure assembly 22 being substantially evenly distributed between the first strap 104, the second strap 106 and the strap 134. Thus, the hood 14 will not work loose because of movement of the horse 10.

The first and second straps 104 and 106 are preferably constructed of a flexible material such as two inch nylon webbing, similar to the material utilized in the construction of the binding strap 33. The D-rings 110 are of conventional construction, and the strap 134 is also preferably constructed of a material such as two inch nylon webbing.

As a matter of convenience, it may be desirable to sew the male portions (the hook elements) of the closure assemblies 108 and 109 onto the first surface 122 of the fixed end portion 119 and the second surface 124 of the free end portion 120, and to sew the female portions (the loop elements) thereof onto the first surface of the free end portion 120 and the first surface 116 of the free end portion 114. Thus, one of the male portions of the closure assemblies 108 and 109 would be connected to one of the first surfaces, and one of the female portions thereof would be connected to the other first surface whereby the second and third portions of flexible webbing can be removably connected when the first portion of flexible webbing is not connected therebetween.

DESCRIPTION OF THE SECOND HOOD STRAP CLOSURE ASSEMBLY

As can be seen in FIG. 5, the second hood strap closure assembly 24 generally comprises a first strap 140, a second strap 142, a first closure assembly 144, a second closure assembly 146, and a pair of D-rings 148.

The first strap 140 has a fixed end portion 150 generally connected to a side portion of the hood 14 near the strap 134, a free end portion 152 and a medial portion 153 disposed near the second strap 142. The first strap 140 also has a first surface 154 and an opposite second surface 156. More particularly, a portion of the surface 156 extending from the fixed end portion 150 to a medial portion of the first strap 140 is specifically connected to the outer surface 96 of the hood 14.

The second strap 142 has a fixed end portion 158 connected to a medial portion of the first surface 154 of the first strap 140, and a free end portion 160. The second strap 142 also has a first surface 162 and an opposite second surface 164.

The first closure assembly 144 has a first portion 166 connected to the first surface 154 near the free end portion 152 of the first strap 140, and a second portion 168 connected to the first surface 154 thereof near the medial portion 153.

The second closure assembly 146 has a first portion 170 connected to the second surface 156 of the first strap 140 near the free end portion 152 and opposite the second portion 168 of the first closure assembly 144. The second closure assembly 146 also has a second portion 172 connected to the first surface 162 of the second strap 142, near the free end portion 160 thereof.

Each respective portion of the first and second closure assemblies 144 and 146 defines a male portion or a female portion thereof, in a manner similar to that of the closure assemblies 82, 108 and 109. In addition, the first and second closure assemblies 144 and 146 are also preferably in the form of Velcro closure assemblies, as are the closure assemblies 82, 108 and 109.

For the purpose of describing the second hood strap closure assembly 24, in a manner similar to that of the first hood strap closure assembly 22, it is convenient to consider the free end portion 152 of the first strap 140 as defining a free end portion of a first portion of flexible webbing, with the medial portion 153 of the first strap 140 defining a second portion of flexible webbing. Furthermore, the first and second surfaces 154 and 156 of the free end portion 152 similarly define opposite surfaces of the first portion of flexible webbing, and the portion of the first surface 154 near the medial portion 153 likewise defines a first surface of the second portion of flexible webbing. Since the free end portion 152 and the medial portion 153 (that is, the first and second portions of flexible webbing, respectively) form integral portions of the strap 140, the first and second portions of flexible webbing can be considered as being integrally connected. In addition, it is also convenient to consider the free end portion 160 of the second strap 142 as defining a third portion of flexible webbing, with an adjacent portion of the first surface 162 of the second strap 142 defining a first surface of the third portion of the flexible webbing.

Once again, for purposes of explanation, it is convenient to consider the first portion 166 of the first closure assembly 144 as being connected to one of the surfaces of the free end portion of the first portion of flexible webbing (that is, the first surface 154 of the free end portion 152), and the second portion 168 of the first closure assembly 144 as being connected to one of the first surfaces of the second or third portions of flexible webbing (that is, the first surface 154 of the medial portion 153). It follows from the above that the first portion 170 of the second closure assembly 146 is connected to the other of the surfaces of the free end portion of the first portion of flexible webbing (that is, the second surface 156 of the free end portion 152), and the second portion 172 of the second closure assembly 146 is connected to the other of the first surfaces of the second or third portions of flexible webbing (that is, the first surface 162 of the second strap 142).

The D-rings 148 are connected to the fixed end portion 150 of the first strap 140, in a side-by-side relationship.

When it is desired to position the second hood strap assembly 24 in a connected position, the first end portion 152 of the first strap 140 is threaded through the D-rings 148, and the second portion 168 of the first closure assembly 144 is pressed against the first portion 166 thereof in a manner similar to that of positioning the first strap 104 of the first hood strap assembly 22 in a connected position. Then, the second portion 172 of the second closure apparatus 146 is pressed against the first portion 170 thereof, wherein the second strap 142 is placed in a fastened condition reinforcing the connection of the second portion 168 of the first closure apparatus 144 to the first portion 166 thereof. Thus, in a manner of speaking, said one surface of the free end portion of the first portion of flexible webbing (i.e., the first surface 154 of the free end portion 152) is removably connected to said first surface (i.e., the first surface 154 of the medial portion 153). Furthermore, said other surface of the free end portion of the first portion of flexible webbing (i.e., the second surface 156 of the free end portion 152) is removably connected to said other first surface (i.e., the first surface 162 of the second strap 142). In this connected position, the third portion of flexible webbing is substantially connected to the second portion of flexible webbing via the connection of the fixed end portion 158 of the second strap 142 to a medial portion of the first strap 140, with the first surface of the third portion of flexible webbing (i.e, the first surface 162 of the second strap 142) being disposed adjacent to the first surface of the second portion of flexible webbing (i.e., the first surface 154 of the medial portion 153).

The first strap 140 therefore substantially extends all the way around the neck portion of the hood 14, when the hood 14 is attached to the horse 10. Any force applied to the second strap closure assembly 24, such as via movement of the horse 10, will thereby be distributed to the horse 10 in a manner similar to that of the distribution of force provided via the binding strap 33.

The first and second straps 140 and 142 are preferably constructed of a material such as two inch nylon webbing connected to the hood 14 via wrapped nylon thread. The D-rings 148 are preferably of conventional construction.

As can be seen in FIG. 7, a strap assembly 173 is utilized to connect the hood 14 to the blanket 12. The strap assembly 173 generally comprises a plurality of D-rings 174 connected to an upper front end portion of the blanket 12, and a corresponding plurality of D-rings 176 connected to a portion of the inner surface 94 of the hood 14 near a shoulder portion of the hood 14, and a corresponding plurality of strap members 178. More particularly, in an attached position of the hood 14 and the blanket 12 on the horse 10, each D-ring 174 is positioned near one of the D-rings 176. Each of the strap members 178 is inserted through adjacent D-rings 174, 176, with the loose end portions of the respective strap member 178 being connected in a conventional manner. Thus, the hood 14 is connected to the blanket 12 as well as the horse 10.

Changes may be made in the construction of the parts or elements, or in the methods as described herein, without departing from the spirit and scope of the invention as defined in the following claims.

What is claimed is:

1. In combination with a horse blanket having an outer surface, an inner surface, a left rear corner portion and a right rear corner portion, the improvement comprising a leg strap closure assembly connected to each of the left rear corner portion and the right rear corner portion, each leg strap closure assembly comprising:

a first strap having a fixed end connected to a portion of the outer surface of the horse blanket, and having a free second end;

a snap shackle connected to the free second end of the first strap;

a second strap having a fixed end connected to a portion of the inner surface of the horse blanket opposite the fixed end of the first strap, and having a free second end, the second strap constructed of an elastic material; and a D-ring connected to the free second end of the second strap, the snap shackle being removably connected to the D-ring with the first and second straps to provide a resilient attachment to each respective rear leg of a horse.

2. A closure assembly for connecting a hood having opposite first and second sides to a horse comprising:

a first strap portion of flexible webbing including a free end having opposite surfaces;

a second strap portion of flexible webbing having a fixed end attached to the first side of the hood and having a first surface;

a third strap portion of flexible webbing having a first surface, said third strap portion connected to the first side of the hood;

first closure means including a first closure portion connected to one of the surfaces of the free end of the first strap portion and a second closure portion connected to the first surface of the second strap portion, for removably connecting said free end of the first strap portion to said second strap portion;

second closure means including a first closure portion connected to the other of the surfaces of the free end of the first strap portion and a second closure portion connected to the first surfaces of the third strap portion, for removably connecting said other surface of the free end of the first strap portion to the third strap portion so that the free end of the first strap portion is detachably connected to the second strap portion and to the third strap portion in a connected position; and connecting means supported by the second side of the hood for receiving the free end of the first strap portion therethrough, and for cooperating with said first strap portion to interconnect said first and second hood sides when the first strap portion is in said connected position whereby the hood can be securely attached to the head portion of the horse.

3. The closure assembly of claim 2 wherein one of the first and second closure portions of each of the first and second closure means is further characterized as being a male portion, and wherein the other of the first and second closure portions of each of the first and second closure means is further characterized as being a female portion, each male portion being generally insertable into and engageable with the respective female portion, each male portion having a plurality of resilient hook elements, and each female portion having a plurality of resilient loop elements, the hook elements of one of the male portions removably engaging the loop elements of one of the female portions when said hook elements and said loop elements are pressed together.

4. The closure assembly of claim 3 wherein the first strap portion and the second strap portion are integrally connected.

* * * * *